J. BERENDS.
WHEEL DRIVING MECHANISM.
APPLICATION FILED APR. 21, 1910.
986,262.
Patented Mar. 7, 1911.
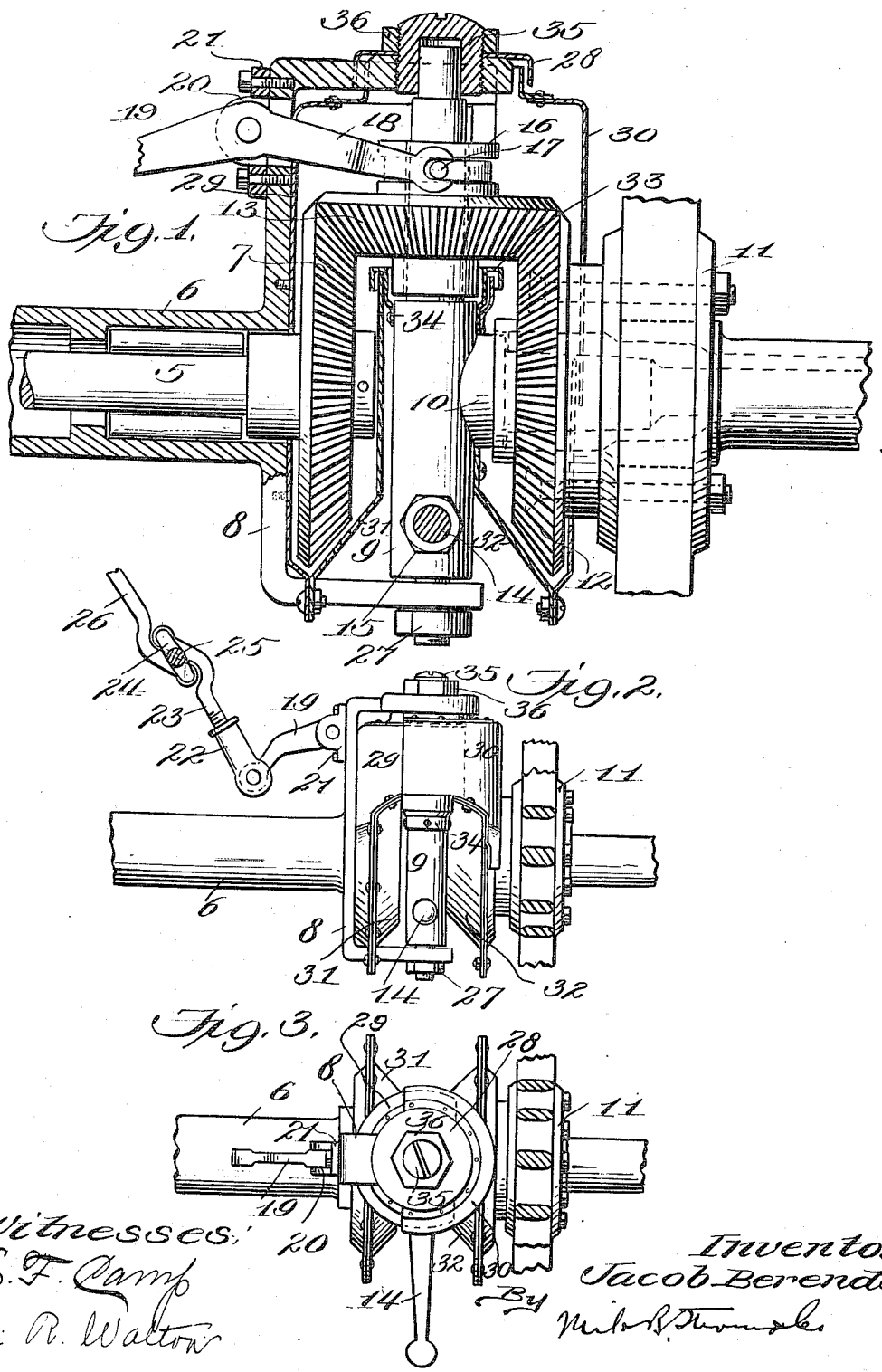

UNITED STATES PATENT OFFICE.

JACOB BERENDS, OF ENGLEWOOD, KANSAS.

WHEEL-DRIVING MECHANISM.

986,262.

Specification of Letters Patent.   Patented Mar. 7, 1911.

Application filed April 21, 1910.   Serial No. 556,742.

*To all whom it may concern:*

Be it known that I, JACOB BERENDS, a citizen of the United States, residing at Englewood, in the county of Clark and State of Kansas, have invented certain new and useful Improvements in Wheel-Driving Mechanism, of which the following is a specification.

My invention relates to combined driving and steering wheels for automobiles and other motor vehicles, my object being to provide certain novel features of construction and arrangement whereby a clutch may be formed and certain other advantages gained.

My invention, therefore, resides in features of construction and arrangement as shown in the accompanying drawing, wherein, Figure 1 is a vertical section through my improved device. Fig. 2 is a side elevation, and Fig. 3 is a top plan view.

Referring to these figures, the driving shaft 5 extends through the hollow axle 6 and has upon its end a bevel gear 7 within a vertical yoke-frame 8 rigid with the adjacent end of the axle, said yoke-frame having apertures adjacent the ends of its arms to receive the reduced threaded lower end and smooth upper end of the vertical pivot pin 9.
The pivot pin 9 rigidly supports the inner end of the wheel spindle 10 upon which the hub 11 revolves, said hub having a bevel gear 12 directly opposing the driving shaft gear 7. Thus the bevel gear 13, upon the pivot pin 9, and engaging the gears 7 and 12 forms a means to transmit the shaft rotation to the wheel hub and permits the said pin to rotate and swing the spindle 10 to guide the wheel at the same time. To this end, pivot pin 9 has a lower transverse bore in which the inner end of a steering arm 14 is locked, by a nut 15.

The transmission gear 13 is slidable upon pin 9 so that it is moved in and out of engagement with gears 7 and 12 and thus establishes or disrupts their connection, and has an upper sleeve 16 provided with an annular channel in which is disposed a split collar having trunnions 17 to be engaged by the slotted extremities of a yoke 18 forming one part of a lever 19 projecting through an opening in the yoke frame 8 and having an intermediate enlargement located within the socket 20 of a bracket 21 secured to said yoke-frame and forming the fulcrum of said lever. The outer end of lever 19 is pivotally connected to member 22 having a threaded bore in which is adjustably connected one threaded end of member 23, the opposite end of which is pivotally connected to one portion of the double crank 24 of a rod 25, the operating rod 26 being similarly connected to the other portion of said crank 24.

The lower end of pin 9 projecting through yoke-frame 8 is secured by nut 27, and the upper end of said pin 9 rotates within an adjustable threaded socket 35, which connects with a threaded bore in the upper end of yoke arm 8 and is secured by locknut 36 which serves to hold a flanged cap 28 overlapping the inner upstanding flanges of outer housings 29 and 30 secured to yoke-frame 8 and pivot 9, respectively, outside of the gears 7 and 12, the upper portions of which are curved and overlap so as not to interfere with the swinging of the hub, and the lower side portions of which have apertured edge flanges to which are bolted the similar flanges of inner housings 31 and 32 located between pin 9 and gears 7 and 12. The upper ends of the latter housings are lapped by a cap 33 secured to a collar 34 mounted on pin 9.

This construction thus renders the housing of the gears practically dust proof without interfering with the movement of gear 13 or guiding of the wheel as previously described.

I claim:

The combination of a driving shaft, an axle having a yoke-frame, a threaded socket adjustable in the upper portion of said yoke frame, a pivot pin having a smooth upper end rotating within said socket and a reduced end extending through the lower portion of the frame, a wheel spindle carried by said pin, opposing gears carried by said driving shaft and said spindle, a gear loosely mounted on said pivot pin and connecting said opposing gears, and a yoke for moving said latter gear to disconnect the former gears.

In testimony whereof I affix my signature in presence of two witnesses.

JACOB BERENDS.

Witnesses:
W. P. ROGERS,
JACOB F. BERENDS.